(12) United States Patent
Wood et al.

(10) Patent No.: US 6,820,059 B2
(45) Date of Patent: Nov. 16, 2004

(54) METHOD FOR REDUCING FRAUD IN GOVERNMENT BENEFIT PROGRAMS USING A SMART CARD

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 0 days.

(21) Appl. No.: 10/428,213

(22) Filed: May 2, 2003

(65) Prior Publication Data

US 2004/0204951 A1 Oct. 14, 2004

Related U.S. Application Data

(60) Provisional application No. 60/461,226, filed on Apr. 8, 2003.

(51) Int. Cl.$^7$ .............................................. G06F 17/60
(52) U.S. Cl. ....................................................... 705/4
(58) Field of Search ............................... 705/2, 3, 4, 1, 705/53; 283/54

(56) References Cited

U.S. PATENT DOCUMENTS

| | | | | |
|---|---|---|---|---|
| 5,070,452 A | * | 12/1991 | Doyle et al. ..................... | 705/2 |
| 5,224,173 A | * | 6/1993 | Kuhns et al. ................. | 382/116 |
| 5,457,747 A | * | 10/1995 | Drexler et al. ............... | 713/186 |
| 5,536,045 A | * | 7/1996 | Adams ......................... | 283/67 |
| 5,884,271 A | * | 3/1999 | Pitroda .......................... | 705/1 |
| 6,012,035 A | * | 1/2000 | Freeman et al. .............. | 705/2 |
| 6,163,770 A | | 12/2000 | Gamble .......................... | 705/4 |
| 6,208,973 B1 | * | 3/2001 | Boyer et al. .................... | 705/2 |

FOREIGN PATENT DOCUMENTS

| WO | WO 200039714 A1 | * | 7/2000 | ........... G06F/17/30 |
|---|---|---|---|---|
| WO | WO 01/04821 A1 | * | 1/2001 | ........... G06F/17/60 |

OTHER PUBLICATIONS

Rehnquist, Janet. "Improper Fiscal year 2002 Medicare Fee–for–Service Payments," Jan. 8, 2003 (A17–02–02202).
Eiland, "A Bill to be Entitled an Act." Acts of the 75$^{th}$ Legislature, Regular Session, 1997.
Ogden, "A Bill to be Entitled an Act." Acts of the 78$^{th}$ Legistlature, Regular Session, 2003.
"Texas Senate Special Committee on Prompt Payment of Health Care Providers." Interim Report to the 78$^{th}$ Legislature, Nov. 2002.

* cited by examiner

*Primary Examiner*—Joseph Thomas
*Assistant Examiner*—Christopher L. Gilligan
(74) *Attorney, Agent, or Firm*—Wendy Buskop; Buskop Law Group, P.C.

(57) ABSTRACT

The method for reducing fraud in a non-health government benefit program entails by registering a service provider with a non-health government agency and issuing a service provider identification code, registering at least one service of the service provider with the non-health government agency and identifying a claim code for each registered service; issuing a smart card to an individual related to a benefits program of the non-health government agency wherein the individual has an identification code and the smart card has a feature to identify the individual; using the smart card to determine if the individual is the authorized card bearer and is eligible for the non-health government benefit program; using the smart card to determine if a service provider is preauthorized to provide a registered product under the non-health government program; and using the smart card to facilitate a transmission between the service provider and the non-health government agency.

26 Claims, 6 Drawing Sheets

| Individual Name (502) | Individual SSN (512) | Government Email (522) | Other Phone Numbers (532) |
| --- | --- | --- | --- |
| Individual Address (504) | Governmental Benefit Program Name (514) | Government Social Service Program Administrator (524) | Instructions on How to Contact Government (534) |
| Individual Phone (506) | Governmental Benefit Program Address (516) | Description of Social Service Benefit Plan (526) | Expiration Date of the Card (536) |
| Individual Fax (508) | Government Phone (518) | Individual Payment Amount (528) | Government Website (538) |
| Individual Email (510) | Government Fax (520) | Individual's Benefit History (530) | Chip to Link to the Government for Information on the Benefit Program (540) |

Medical Security
SMART CARD

John Doe

3390 01 12 334 309

XYZ Medical Insurance

Insta-Pay or Express-Pay

Emergency Information

METHOD FOR REDUCING FRAUD IN GOVERNMENT BENEFIT PROGRAMS USING A SMART CARD

BACKGROUND OF THE INVENTION

The present application claims priority from Pending Provisional Patent Application Ser. No. 60/461,226 titled "METHOD FOR REDUCING FRAUD IN GOVERNMENT BENEFIT PROGRAMS USING A SMART CARD," filed in the U.S. Patent and Trademark Office on Apr. 8, 2003.

FIELD OF THE INVENTION

The present invention relates to a method for reducing fraud in a government benefit program using a smart card that contains identification, security measures, and other information to facilitate the transfer of funds and eliminate fraud in the benefit.

Providers of benefit from government agencies have had concerns wherein individuals could "double dip" in government programs, or service providers could inadvertently "double bill" or inappropriately bill for services rendered.

In addition, proper service and goods providers for government benefit programs have had to wait for long periods of time to get paid for their services or goods rendered to the eligible employee. This situation has become tedious and causes benefit costs to be very high, reducing overall benefits available due to these fraud issues.

A need has long existed for a system, wherein the government advances funds to pay for services of a service or goods provider so that an eligible individual does not have to handle money.

This need has been particularly great for incapacitated individuals, such as those in nursing homes, who are no longer able to handle funds or complicated transactions to have a system wherein a government benefit can be provided properly to a health care provider or similar benefits provider in a timely manner with payment to the provider.

A need exists for a method to reduce the magnitude of transaction costs involved in reviewing and adjudicating payment requests to a governmental agency that would have the effect of reducing the rate of government benefit costs, or enable more benefits to be provided to more people.

A need exists to reduce the traditionally high cost of benefits administration, including the review and adjudication of payment requests which results from benefit service or goods providers having to act as "banks" or "credit sources" for individuals eligible for the benefit.

Methods and apparatus exist to attempt to streamline the insurance claim payment process, such as the method disclosed in U.S. Pat. No. 6,163,770. This patent revealed using a digital electrical apparatus to generate output for insurance documentation for a first insurance policy having a first risk and claims while revealing a concurrent second insurance policy for a second risk, wherein the second risk is different from the first.

The processor of this method is connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy; and computing a value of a specific financial attribute of the first insurance policy; the method further including the step of inserting the value of the financial attribute in the first insurance policy and other printed documentation related to the first insurance policy. However, this method did not apply to government programs in a simple and direct manner, as with the present system which was designed to meet these needs.

SUMMARY OF THE INVENTION

The present invention provides a method for reducing fraud in a non-health government benefits program.

The method involves registering a service or goods provider with a non-health government agency and issuing a service provider identification code to that provider. Services and goods of the provider can be registered with the non-health government agency and claim codes would correspond with each registered service.

The method involves using a smart card, which is issued to an individual eligible for a government benefits program of a non-health government agency. The smart card is used to determine if the individual is the authorized bearer of the card and if the individual is eligible for benefits from the non-health government benefit program.

The card is then used to facilitate three transmissions between the service provider to the non-health government agency by providing relevant information about proposed goods and services, information about the individual and information about accelerating payment for the program.

More specifically, the invention is a method for reducing fraud in a government benefit program. The method entails registering a service provider with a governmental agency and issuing a service provider identification code and registering at least one service or at least one good of the service provider with the governmental agency and identifying a claim code for each registered service or registered good. Next, the method continues by issuing a smart card to an individual related to a government benefit program of the governmental agency wherein the individual has an individual identification code and the smart card has a smart card identification feature to identify the individual; using the smart card to determine if the individual: is the authorized bearer of the card; and is eligible for benefits from the government benefit program.

The smart card is used to determine if a service provider is preauthorized to provide a registered product or registered service under the government benefit program. In addition the smart card is used to facilitate a first transmission from the service provider to the government agency. The first transmission includes the service provider identification code, the individual identification code, proposed product information for the individual, and proposed service information for the individual. The first transmission also contains corresponding claim codes for the proposed product, corresponding claim codes for the proposed service, a request to confirm: the individual's eligibility for benefits under the government benefit program, a validation that the proposed good or service is approved for the individual, the service provider's eligibility to render services or provide goods under the government benefit program, and a request to participate in an accelerated payment program for the proposed good or the proposed service.

In the method the smart card is used to facilitate a second transmission from the government agency to the service provider, wherein the second transmission includes the individual's eligibility for benefits under the government benefit program; a validation that the proposed good or proposed service is approved for the individual; a validation of the service provider's eligibility to render services under the government benefit program; a confirmation that an accelerated payment program is available; and an authorization code to provide the proposed product and/or proposed service.

The smart card the is used to facilitate a third transmission from the service provider to the government agency, wherein the third transmission is a list of claim codes for services rendered; acknowledgement by the individual that information on the product and/or service was provided to the individual; acknowledgement that the product or service has been received from the service provider; and a request for accelerated payment by the governmental agency to the service provider.

BRIEF DESCRIPTION OF THE DRAWINGS

The present invention will be explained in greater detail with reference to the appended Figures, in which.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments herein and it can be practiced or carried out in various ways.

The invention relates to a method for accelerating the providing funds to a service or goods provider from a non-health government agency, such as a non-health federal, state or municipal government agency using a smart card.

This invention relates to the provision of a non health government benefit using a plastic card with a chip in it or a plastic card with a magnetic strip. The chip or strip can contain information on an individual, the benefit plan applied for, and other related information. It is contemplated that a plastic smart card could be used with a magnetic strip containing key information without requiring a chip or with both a chip and a magnetic strip.

The invention advantageously reduces fraud on the government by providing a safe method of pre-authorizing users for benefits prior to rendering the benefit.

The invention also advantageously avoids ineligible users from using services for which they are not authorized. The invention safe guards the government from users attempting to apply for the same service more than once, in other words "double dipping".

The first step of the method involves of: registering a service provider with a governmental agency and issuing a service provider identification code. Next at least one service or at least one good of the service provider is registered with the governmental agency and a claim code corresponds to each registered service or registered good.

A smart card is issued to an individual and is tied or otherwise related to a particular government benefit program of the governmental agency such as to the food stamp program of the State of Texas. In this situation, the individual has an individual identification code and the smart card has a smart card identification feature to identify the individual, such as through a biometrics device, like a fingerprint reader or a retinal reader.

A service provider or goods provider can use the smart card to determine if the individual is the authorized bearer of the card and is eligible for benefits from the government benefit program for which the service or goods provider can be compensated.

The smart card can also be used to determine if a service or goods provider is preauthorized to provide a registered product or registered service under the government benefit program.

Next the smart card is used to facilitate a first transmission from the service provider to the government agency, wherein the first transmission comprises: a service provider identification code; the individual identification code described above; and certain proposed information.

The proposed information can be proposed product information for the individual; proposed service information for the individual; corresponding claim codes for the proposed product; and corresponding claim codes for the proposed service.

The first transmission preferably includes a request to confirm the individual's eligibility for benefits under the government benefit program; a validation that the proposed good or service is approved for the individual; the service provider's eligibility to render services or provide goods under the government benefit program; and a request to participate in an accelerated payment program for the proposed good or the proposed service The smart card can be used to facilitate a second transmission from the government agency to the service provider. The second transmission includes the individual's eligibility for benefits under the government benefit program, a validation that the proposed good or proposed service is approved for the individual, a validation of the service provider's eligibility to render services under the government benefit program, a confirmation that an accelerated payment program is available, and an authorization code to provide the proposed product and/or proposed service.

The smart card can facilitate a third transmission from the service provider to the government agency. The third transmission includes a list of claim codes for services rendered, an acknowledgement by the individual that information on the product and/or service was provided to the individual, an acknowledgement that the product or service has been received from the service provider, and a request for accelerated payment by the governmental agency to the service provider.

Typically, the smart card is created for the individual but one card could be created for a group of individuals.

For the chip version of the smart card, the card is first manufactured in a conventional manner, and then the relevant information is downloaded from the computers of the government to the card. For a non-chip version of a smart card, the card manufacturer would be provided information about the individual from the government and embed the relevant information in the magnetic strip and then mail or transfer the magnetic strip card to the user.

The individual can be the primary individual, another individual, a spouse, at least one dependent, such as one or more children, or it can be combinations of these.

The smart card can contain information about benefits for which an individual is eligible and an identification code, such as a "PIN" or other type of identification such as retinal or biometric identification means.

The smart card is preferably an electronically readable card that can connect to a computer of the government agency, such as via the Internet or telephone line. The card is contemplated to contain information on at least one or more of the following:
a. individual name (example—Richard Wood);
b. individual address (example—2396 Wood Street, Houston, Tex. 77019);
c. individual phone number (example —713-323-5555);
d. individual fax number (example—713-323-5554);
e. individual email address (example—Wood@aol.com);
f. government agency name and/or government administrator name (example—Mary Jones, Supervisor of the Food Stamp Program);
g. government agency address;
h. government phone number (example—281-873-8682);
i. government agency fax number;
j. government agency e-mail;
k. government's website;
l. government claims representative;
m. type of benefit plan or plans;
n. individual benefit number (example—Group 200116289.);
o. individual group number or group plan number (example—KLINASD);
p. individual's co-pay amount (example—$25);
q. individual's benefit history;
r. instructions (example—benefits instructions embedded in the card);
s. other phone numbers;
t. issue date or "validity" date;
u. an expiration date or "expiry date";
v. statements as to ownership of the card;
w. statements as to eligibility of the holder as to the rights of the card and the existence of written agreements related to the card; and
x. disclaimers concerning use, misuse, and revocation of the card.

The smart card can be used to obtain information on funds which are available from the government for a completed authorized social service for a particular individual. The card can obtain information on the typical payment schedule for a particular social service. Generally, the phrase "completed authorized benefit" is considered to be a service that has been authorized by contract by the government and rendered to the beneficiary of the benefit.

The accelerated fund payment schedule could be a 100% payment schedule or a partial accelerated fund payment schedule depending on the contract with the government. It is contemplated that the funds would move electronically from the government's bank account to the service provider's bank account, such as by wire transfer, or similar normal electronic banking procedures.

Additionally, the smart card can be used to obtain information about the various benefit plans held by the individual and whether of the individual uses one plan, and other plan benefit should be denied.

In the method, the smart card is used to determine if the individual is eligible for accelerated provision of funds from the government to a service provider for benefit.

The smart card is used to not only contain the information described above, but to link to the government's database and between the government's database and the service provider's database and the service provider's bank account. The smart card facilitates a first transmission from the service provider to the government. This first transmission can include information on:
i. determination that the card is valid and the individual is eligible;
ii. determination that the service provider is authorized to provide the service;
iii. proposed benefit costs;
iv. information on benefit; and
v. an acknowledgement that at least one benefit has been rendered from the service provider to the individual.

The smart card facilitates the receipt of a second transmission from the government to the service provider. This second transmission can contain information on any amount of payment required by the individual. The amount of payment can be all or part of a co-payment fee, all or part of a deductible fee and combinations of these fees.

The smart card facilitates a third transmission to the government from the service provider. This third transmission would include an acknowledgement that the amount of the co-payment and the deductible has been paid by the individual to the service provider thereby initiating payment by the government.

It should be noted that in the context of this invention, the government is considered an entity that has been authorized by the federal government.

Additionally, the government, as a step in the process, must make contracts with various service providers that can be linked to the smart card.

The method involves that on approximately the same day that the third transmission is received by the government, or perhaps a few days later such as between 1 and 21 days, funds are then transmitted from the government to the service provider for the benefit provided to the individual. This accelerated payment plan is a vast improvement over known systems that take up to eight months to pay a service provider.

This method contemplates that the benefit can be a service related to food stamps, housing, and/or other benefits.

This method contemplates that the smart card can be used to determine if a second opinion is required by the government for the benefit.

Figure 1:
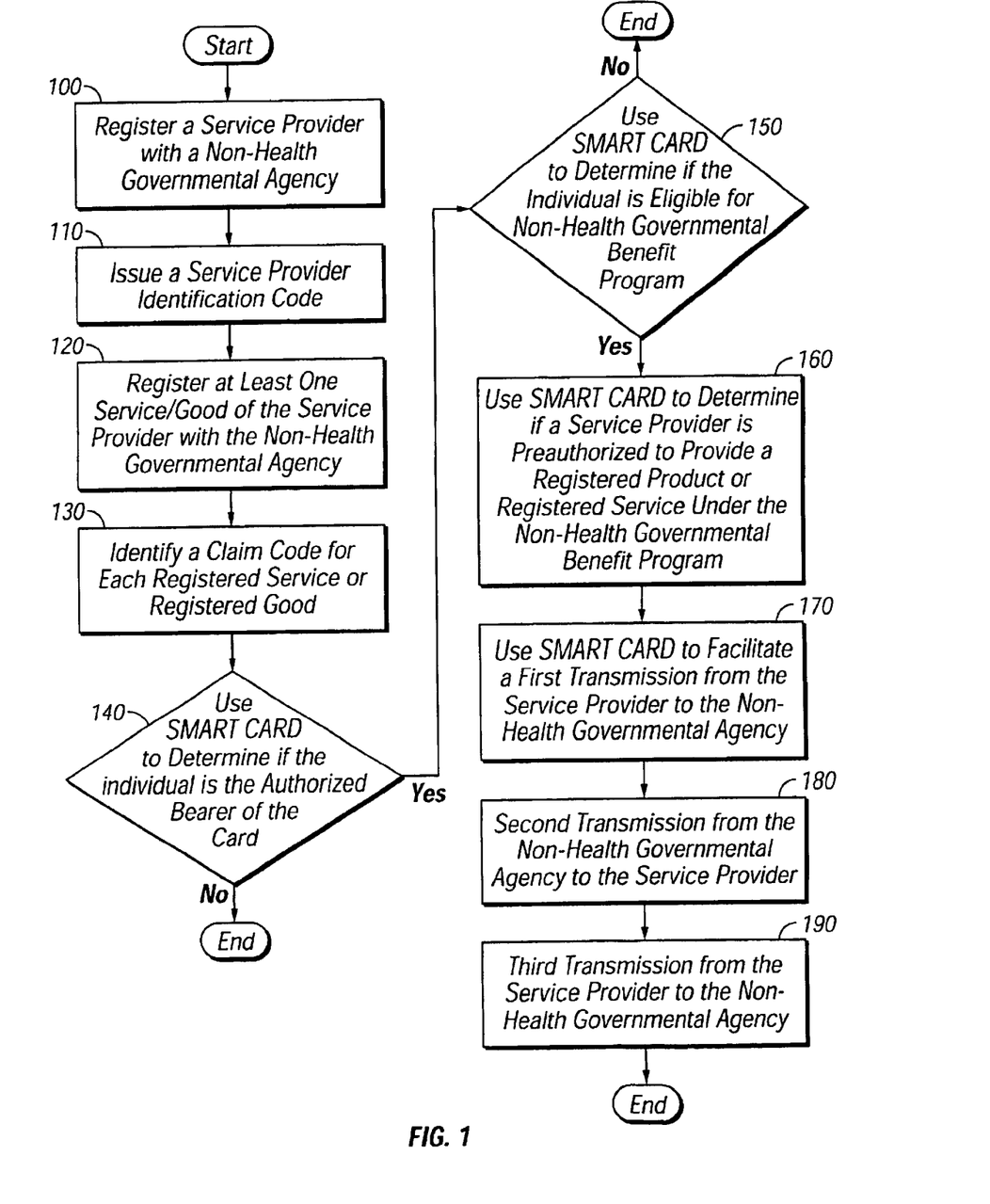
FIG. 1 is a diagrammatic representation of the overall method of the invention.

Now and with reference to the Figures, FIG. 1 shows a diagram of the overall invention.

First, a service provider is registered with a governmental agency (100) and the service provider is given an identification code (110). Next, at least one service or good of the service provider is registered with the governmental agency (120) and a claim code is given for the registered service or good (130).

The smart card is, then, used to determine if the individual is the authorized bearer of the card (140) and if the individual is eligible for the benefit of the non-health government benefit program (150).

The smart card is used to facilitate a first transmission from the service provider to a program administrator (170) for a government agency.

Figure 2:
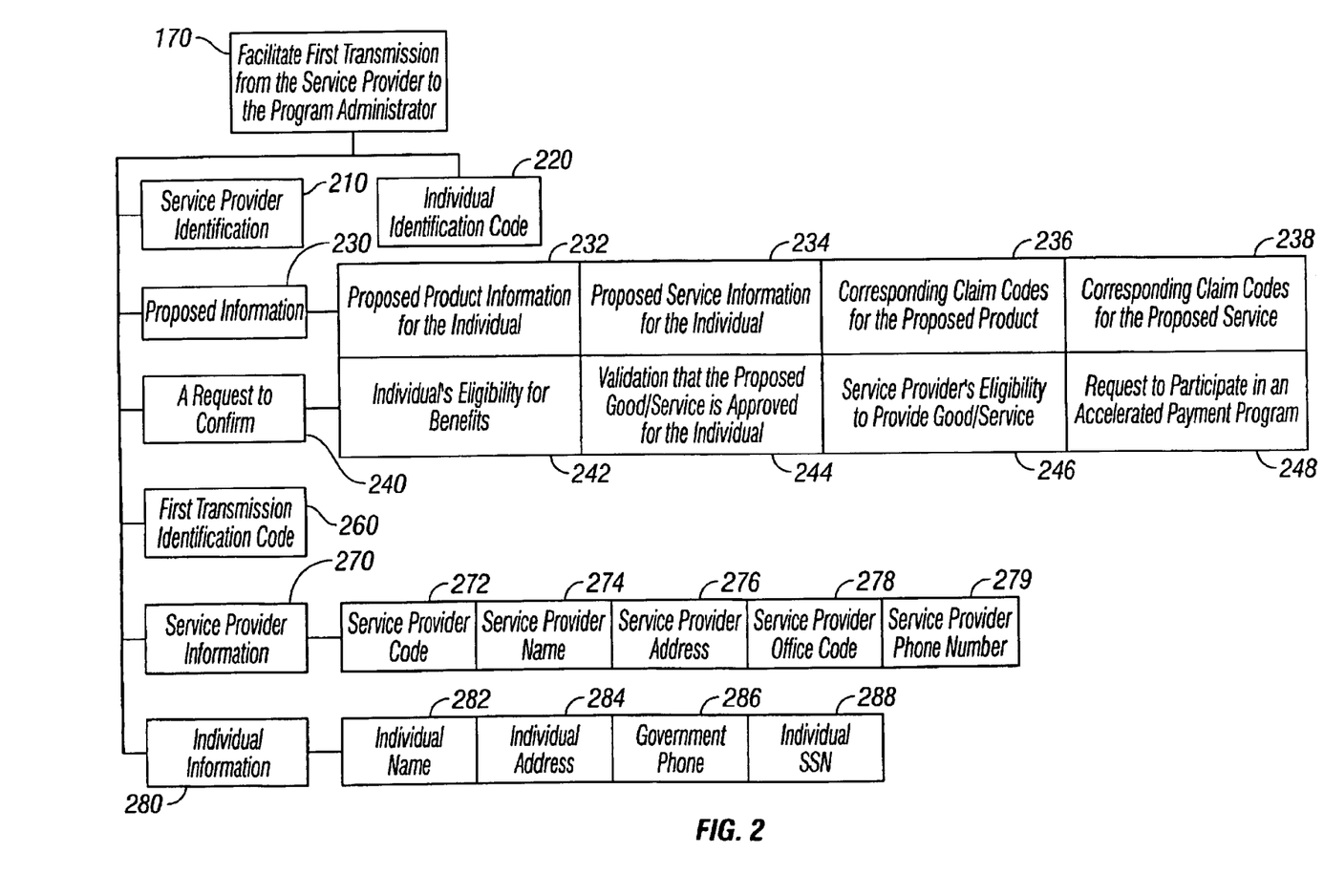
FIG. 2 is a diagrammatic representation of the first transmission.

As shown in FIG. 2, the first transmission (170) includes service provider identification (210), individual identification code (220), proposed information (230), and a request to confirm (240). The proposed information (230) involves proposed product information for the individual (232), proposed service information for the individual (234), corresponding claim codes for the proposed product (236), and corresponding claim codes for the proposed service (238). The request to confirm (240) entails validation that individual's eligibility for benefits (242), the proposed good/service is approved for the individual (244), service provider's eligibility to provide good/service (246), and request to participate in an accelerated payment program (248).

The first transmission (170) can further include a first transmission identification code (260); service provider information (270); and individual information (280). Examples of service provider information (270) are service provider code (272), service provider name (274), service provider address (276), service provider office code (278), and service provider phone number (279). Examples of individual information (280) are individual name (282), individual address (284), government phone (286), and individual social security number (288), and combinations of these.

Referring back to FIG. 1, the smart card is used to facilitate a second transmission from the government to the service provider (180).

Figure 3:
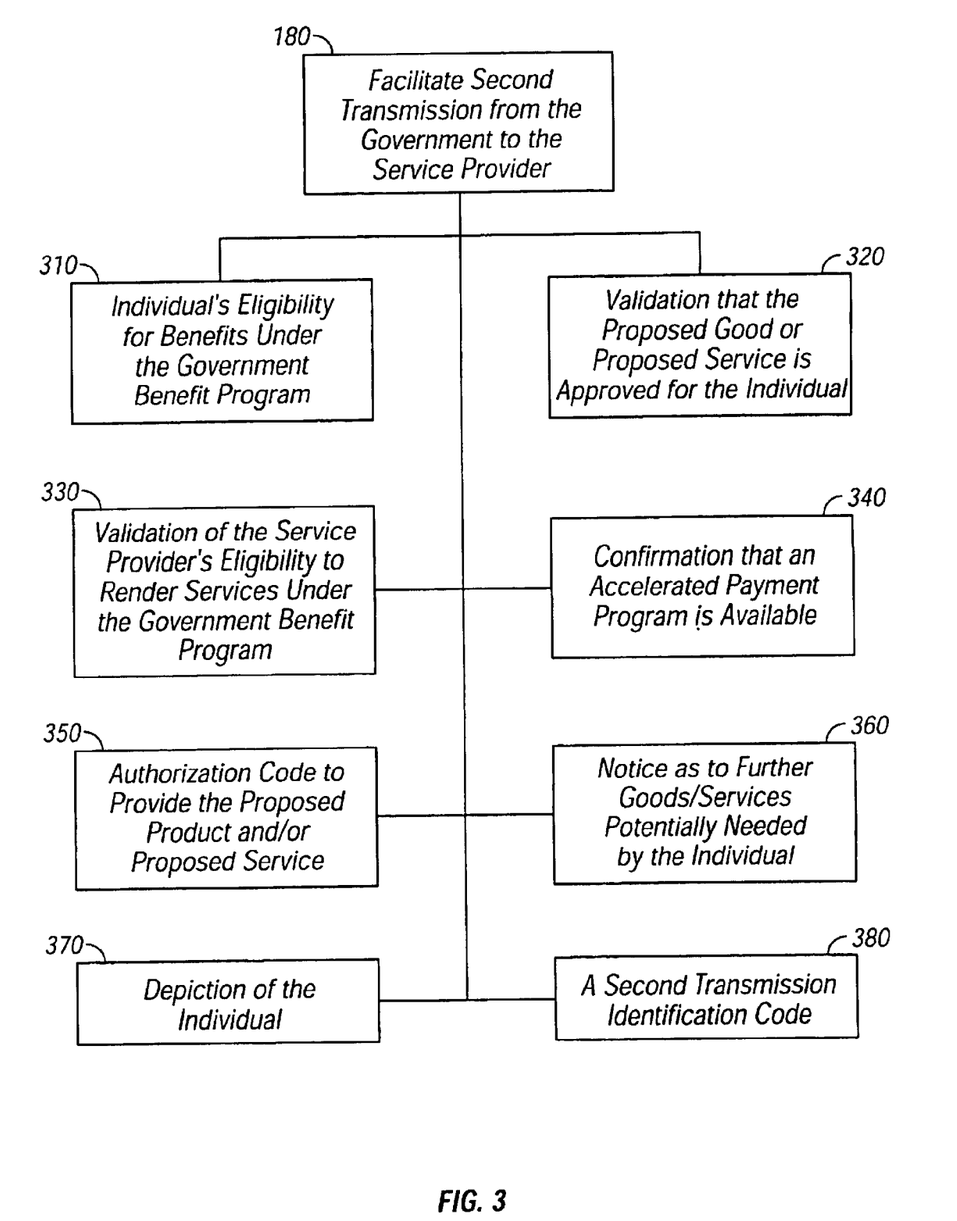
FIG. 3 is a diagrammatic representation of the second transmission.

As shown in FIG. 3, the second transmission (180) includes individual's eligibility for benefits under the non-health government benefit program (310), validation that the proposed good or proposed service is approved for the individual (320), validation of the service provider's eligibility to render services under the non-health government benefit program (330), confirmation that an accelerated payment program is available (340), and authorization code to provide the proposed non-health government product and/or proposed service (350).

The second transmission (180) can also include notice as to further goods/services potentially needed by the individual (360), depiction of the individual (370), a second transmission identification code (380), and combinations thereof.

Referring back to FIG. 1, the smart card, next, is used to facilitate a third transmission from the service provider to the government (190).

Figure 4:
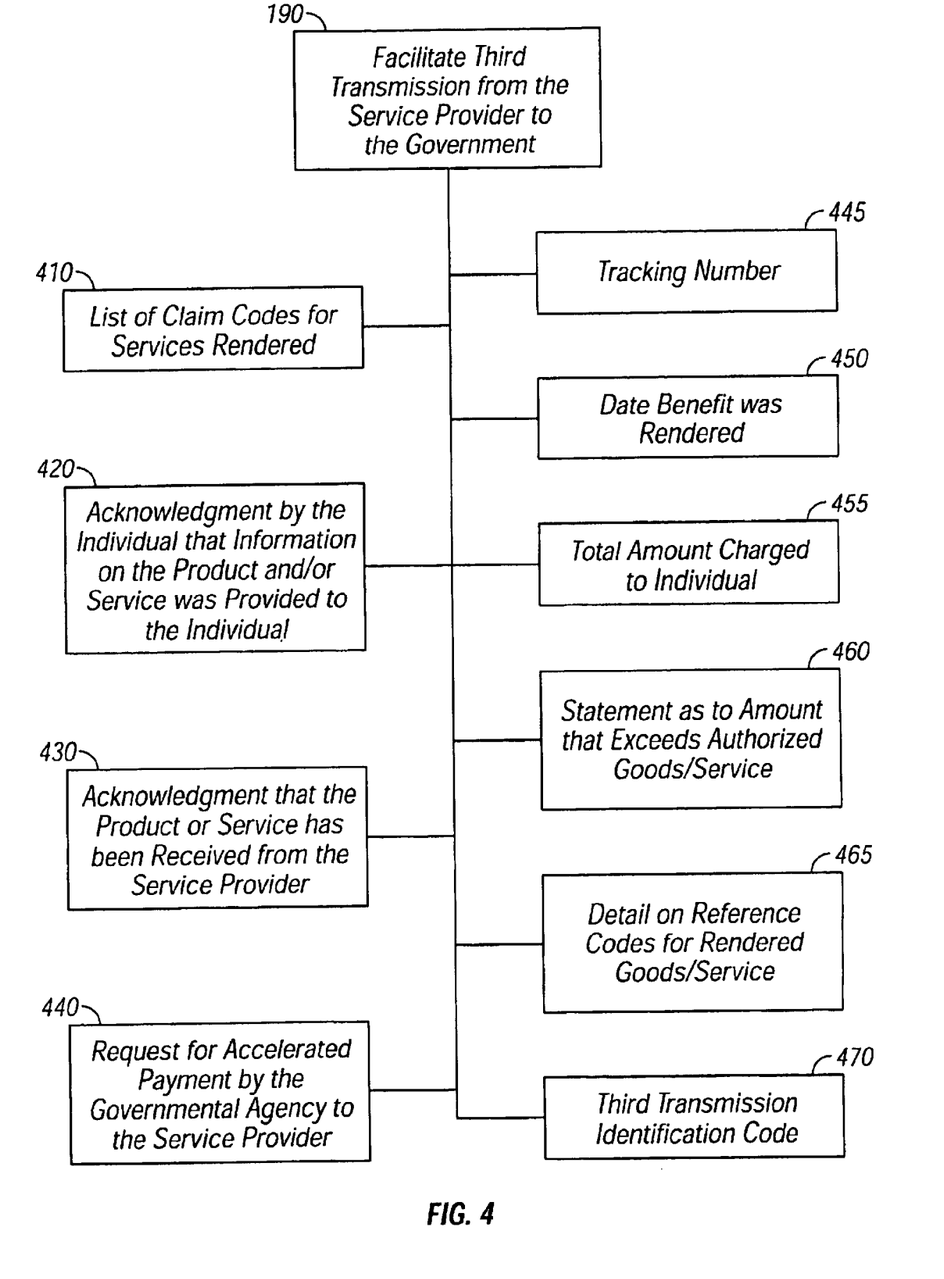
FIG. 4 is a diagrammatic representation of the third transmission.

The third transmission (190), shown in FIG. 4, involves list of claim codes for services rendered (410), acknowledgement by the individual that information on the product and/or service was provided to the individual (420), acknowledgement that the product or service has been received from the service provider (430), and request for accelerated payment by the governmental agency to the service provider (440).

On approximately the same day that the third transmission is received by the government, funds are transmitted from the government to the service provider (180) for the product and/or service provided to the individual.

The third transmission (190) can also involve a tracking number (445); date benefit was rendered (450); total amount charged to individual (455); statement as to amount that exceeds rendered benefit (460); detail on reference codes for rendered benefit (465); a third transmission identification code (470); and combinations thereof.

Figure 5:
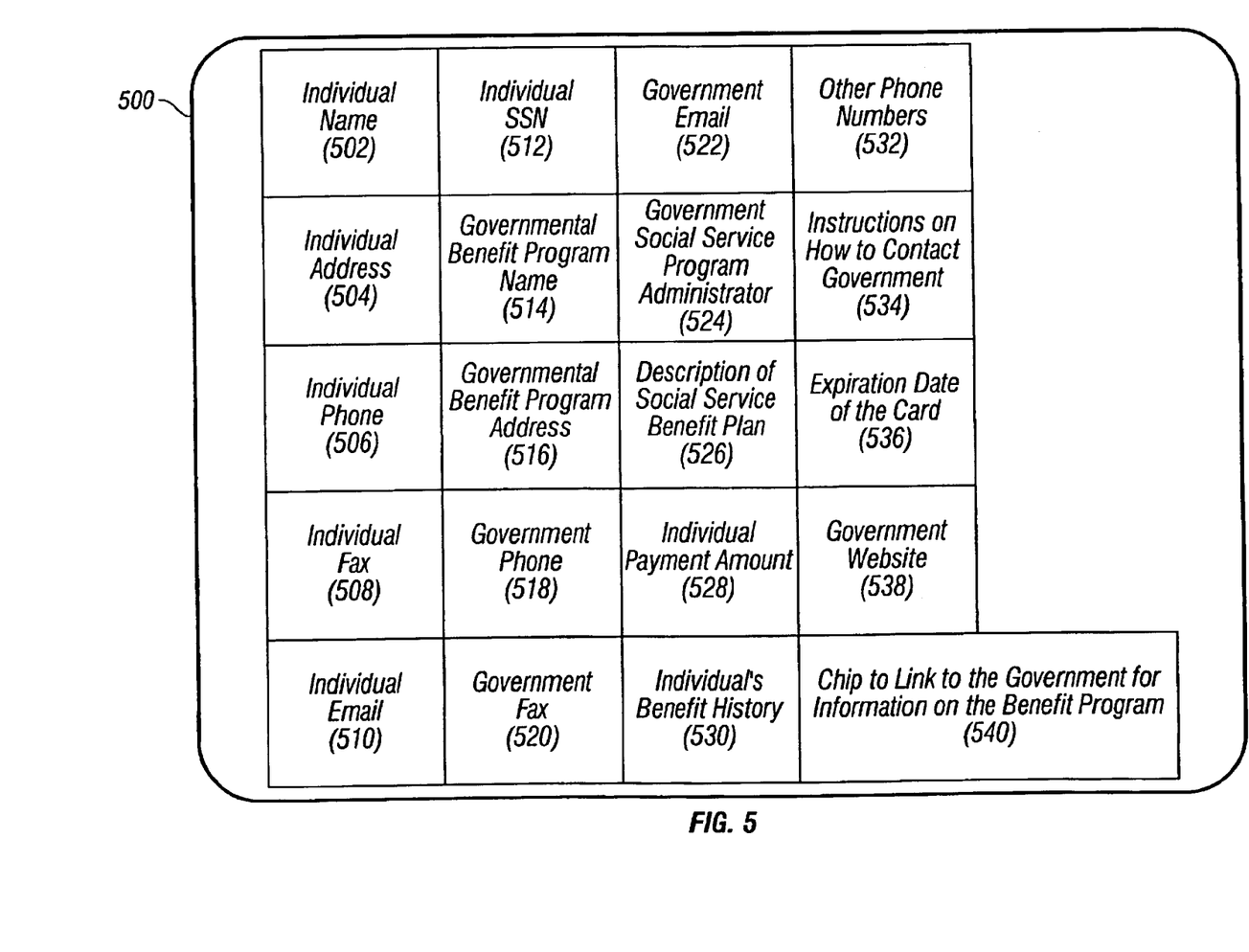
FIG. 5 is a diagrammatic representation of a smart card usable in the invention.

FIG. 5 shows a smart card that is contemplated as within the scope of the invention. The smart card is an electronically readable card containing individual name (502); individual address (504); individual phone number (506); individual fax number (508); individual email address (510); individual social security number (512); government benefit program name (514); government benefit program address (516); government phone number (518); government fax number (520); government e-mail address (522); government benefit program administrator (524); description of benefit plan (526); optional individual payment amount (528); individual's benefit history (530) (this information can include information on length of time on government programs and types of other programs the individual is a participant); other phone numbers (532); instructions on how to contact government (534); expiration date of the card (536); government website (538); a chip to link to the government for information on the benefit program (540); and combinations thereof. Examples of each information type are located earlier in this description.

In alternative embodiments, the method can include the step of creating a contractual relationship between the government and a third party for the benefit of the individual. The method can also include the step of disposing marks on the card. Examples of marks on the card are the government, third parties, service providers and combinations thereof.

The funds can be for a completed authorized benefit. A completed authorized benefit is a service that has been authorized by contract by the government or is a stated item of coverage in a government benefit plan.

Figure 6:
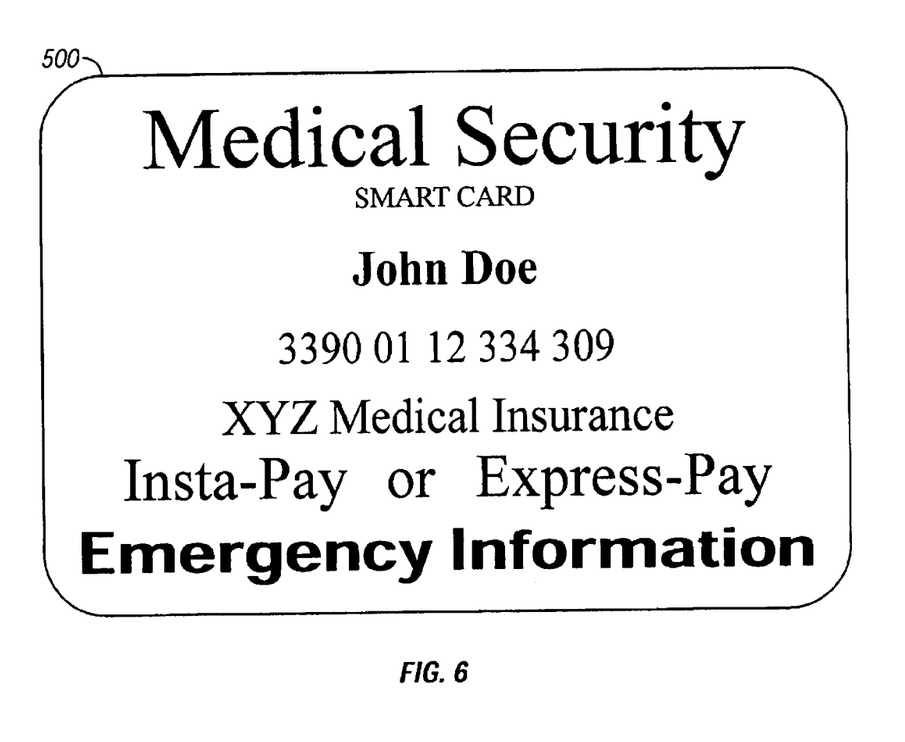
FIG. 6 is a picture of a smart card.

FIG. 6 shows an example of a smart card (500).

The method described herein as its preferred embodiment is a direct transaction between the service provider and the government using the smart card to facilitate the transaction. In an alternative embodiment, the smart card is contemplated to provide aid to third parties intermediaries.

These third party intermediaries act as a go between the government programs and the individuals receiving the benefit from a government program. Examples of third party intermediaries are School Meal programs, job placement assistance programs, organizations like Meals on Wheels, and other similar programs.

The smart card would facilitate access to the funds the government gives to the third party intermediaries. The funds in the third party intermediaries' account would be transferred directly to the service provider once government approved services had been rendered.

The smart card would also enable the third party intermediaries to report in a more expedited manner without additional labor. The government presently requires regular reports, both on an individual basis and in aggregate, in order for the third party intermediaries to receive funds. Using the smart card eliminates the need for the third party intermediaries to create the reports because the smart card tracks and reports automatically.

The invention is also a method for reducing fraud in retirement payment programs. The method begins by registering an individual with a retirement payment agency and issuing a smart card to an individual with an identification code which can be a biometrics code or a pin. Next, the method involves registering at least one service or good provider with the retirement payment agency and identifying a code for the provider and for each service or good provided by that provider.

The method continues by using the smart card to determine if the individual is the authorized bearer of the card and is eligible for benefits from the retirement payment agency. The smart card is also used to determine if a service or good provider is preauthorized to provide a product or service under the retirement payment program.

Next, the smart card is used to facilitate a first transmission from the provider to the retirement payment agency.

This first transmission includes the provider identification code, the individual identification code, and other proposed information. Examples of other proposed information includes proposed product information for the individual; proposed service information for the individual; corresponding codes for the proposed product; and corresponding codes for the proposed service. The first transmission also includes a request to confirm the individual's eligibility for benefits under the retirement payment agency, a validation that the proposed good or service is approved for the individual, the provider's eligibility to render services or provide goods under the retirement payment agency, and a request to participate in an accelerated payment program for the proposed good or the proposed service.

The smart card is next used to facilitate a second transmission from the retirement payment agency to the provider. This second transmission includes the individual's eligibility for benefits under the retirement payment program, a validation that the proposed good or proposed service is approved for the individual, a validation of the provider's eligibility to render services under the retirement payment agency, a confirmation that an accelerated payment program is available, and an authorization code to provide the proposed product and/or proposed service.

The method ends by using the smart card to facilitate a third transmission from the provider to the government agency. This third transmission includes a codes list for services rendered, acknowledgement by the individual that information on the product and/or service was provided to the individual, acknowledgement that the product or service has been received from the provider, and a request for accelerated payment by the retirement payment agency to the service provider.

As in the other methods discussed herein, the method with retirement payment agency also uses the smart card as an electronically readable card with information about the individual and the retirement payment agency.

The smart card is used for the retirement agency program and at least one other government program requiring identification. Examples of other government programs requiring identification are U.S. Passport Agency, Immigration and Naturalization Service, Internal Revenue Service, state driver's licensure agencies, state parks, federal parks, federal monuments, and other similar agencies and organizations.

Also, in any of the discussed methods, the smart card is contemplated to be used for more than one government benefit program or retirement agency program.

While this invention has been described with emphasis on the preferred embodiments, it should be understood that within the scope of the appended claims the invention might be practiced other than as specifically described herein.

What is claimed is:

1. A method for reducing fraud in a non-health government benefits program consisting of the steps of:
   a. registering a service provider with a governmental agency and issuing a service provider identification code;
   b. registering at least one service or at least one good of the service provider with the non-health government agency and identifying a claim code for each registered service or registered good;
   c. issuing a smart card to an individual related to a non-health government benefits program, wherein the non-health government benefits program is associated with the governmental agency, wherein the individual has an individual identification code, and wherein the smart card has a smart card identification feature to identify the individual;
   d. using the smart card with a chip to determine if the individual:
      i. is the authorized bearer of the card; and
      ii. is eligible for benefits from the non-health government benefit program;
   e. using the smart card operatively connected to a biometric device to determine if a service provider is preauthorized to provide a registered product or registered service under the non-health government benefit program;
   f. using the smart card to facilitate a first transmission from the service provider to the government agency, wherein the first transmission comprises:
      i. the service provider identification code;
      ii. the individual identification code;
      iii. proposed information selected from the group consisting of proposed product information for the individual; proposed service information for the individual; corresponding claim codes for the proposed product; and corresponding claim codes for the proposed service; and
      iv. a request to confirm:
         1. the individual's eligibility for benefits under the non-health government benefit program;
         2. a validation that the proposed good or service is approved for the individual;
         3. the service provider's eligibility to render services or provide goods under the non-health government benefit program; and
         4. a request to participate in an accelerated payment program for the proposed good or the proposed service;
   g. using the smart card to facilitate a second transmission from the government agency to the service provider, wherein the second transmission comprises:
      i. the individual's eligibility for benefits under the non-health government benefit program;
      ii. a validation that the proposed good or proposed service is approved for the individual;
      iii. a validation of the service provider's eligibility to render services under the non-health government benefit program;
      iv. a conformation that an accelerated payment program is available; and
      v. an authorization code to provide the proposed product and/or proposed service;
   h. using the smart card to facilitate a third transmission from the service provider to the government agency, wherein the third transmission comprises:
      i. a claim codes list for services rendered;
      ii. acknowledgement by the individual that information on the product and/or service was provided to the individual;
      iii. acknowledgement that the product or service has been received from the service provider; and
      iv. a request for accelerated payment by the governmental agency to the service provider.

2. The method of claim 1, wherein the second transmission further comprises an alert to the service provider that a portion of the funds may need to come from the individual and an indication of the amount of the funds.

3. The method of claim 1, wherein the third transmission further comprises dollar amount limits for the accelerated payment.

4. The method of claim 1, wherein the third transmission further comprises an acknowledgement that funds were collected from the individual by the service provider.

5. The method of claim 1, further comprising the step of wherein between 1 day and 21 days of receipt of the third transmission by the government agency funds are transmitted from the government agency to the service provider.

6. The method of claim 1, wherein the non-health government benefit program is a member of the group consisting of state unemployment programs, state food stamp programs, school lunch programs, government sponsored art and humanity programs, and social security programs.

7. The method of claim 1, wherein the smart card identification feature is a member of the group consisting of: identification code and a biometrics identification system.

8. The method of claim 1, wherein the first transmission further comprises a member of the group consisting of:
   a. a first transmission identification code;
   b. service provider information that comprises a member of the group consisting of:
      i. service provider code;
      ii. service provider name;
   iii. service provider address;
      iv. service provider office code; and
      v. service provider phone number;
   c. individual information that comprises a member of the group consisting of:
      i. individual name;
      ii. individual address;
      iii. government phone number;
      iv. individual social security number; and
      v. combinations thereof.

9. The method of claim 1, wherein the second transmission further comprises a member of the group consisting of:
   a. a notice as to further services or goods potentially needed by the individual;
   b. a depiction of the individual; and
   c. a second transmission identification code and combinations thereof.

10. The method of claim 1, wherein the third transmission comprises:
    a. a tracking number,
    b. a date on which the benefit was rendered;
    c. a total amount charged relative to the individual;
    d. a statement as to any amount that exceeds authorized service or good;
    e. detail on the claim codes for rendered service or good;
    f. a third transmission identification code; and
    g. combinations thereof.

11. The method of claim 1, wherein the smart card is an electronically readable card comprising information selected from the group consisting of:
    a. individual name;
    b. individual address;
    c. individual phone number;
    d. individual fax number;
    e. individual email address;
    f. individual social security number;
    g. government benefit program name;
    h. government benefit program address;
    i. government phone number;
    j. government fax number;
    k. government e-mail address;
    l. government benefit program administrator,
    m. description of government benefit plan;
    n. individual payment amount;
    o. individual's benefit history;
    p. other phone numbers;
    q. instructions on how to contact government agency;
    r. expiration date of the smart card;
    s. government website address;
    t. a chip to obtain the information on the government program; and
    u. combinations thereof.

12. The method of claim 11, wherein the individual's benefit history includes information on length of time on government programs and types of other programs the individual is eligible to use.

13. The method of claim 1, further comprising the step of creating a contractual relationship between the government agency and a third party for the benefit of the individual.

14. The method of claim 1, further comprising the step of disposing marks on the card selected from the group consisting of the government agency trademarks and logos, third party trademarks and logos, service provider trademarks and logos and combinations thereof.

15. A method for reducing fraud in retirement payment programs consisting of the steps of:
    a. registering an individual with a retirement payment agency and issuing a smart card to an individual with an identification code, which can be a biometrics code or a pin;
    b. registering at least one service or good provider with the retirement payment agency and identifying a code for the provider and for each service or good provided by that provider;
    c. using the smart card with a chip to determine if the individual:
       i. is the authorized bearer of the card; and
       ii. is eligible for benefits from the retirement payment agency;
    d. using the smart card operatively connected to a biometric device to determine if a service or good provider is preauthorized to provide a product or service under the retirement payment program;
    e. using the smart card to facilitate a first transmission from the provider to the retirement payment agency, wherein the first transmission comprises:
       i. the provider identification code;
       ii. the individual identification code;
       iii. proposed information selected from the group consisting of proposed product information for the individual; proposed service information for the individual; corresponding codes for the proposed product; and corresponding codes for the proposed service; and
       iv. a request to confirm the transmission:
          1. the individual's eligibility for benefits under the retirement payment agency;
          2. a validation that the proposed good or service is approved for the individual;
          3. the provider's eligibility to render services or provide goods under the retirement payment agency; and
          4. a request to participate in an accelerated payment program for the proposed good or the proposed service;
    f. using the smart card to facilitate a second transmission from the retirement payment agency to the provider, wherein the second transmission comprises:

i. the individual's eligibility for benefits under the retirement payment program;
ii. a validation that the proposed good or proposed service is approved for the individual;
iii. a validation of the provider's eligibility to render services under the retirement payment agency;
iv. a confirmation that an accelerated payment program is available; and
v. an authorization code to provide the proposed product and/or proposed service;
g. using the smart card to facilitate a third transmission from the provider to the government agency, wherein the third transmission comprises:
i. a codes list for services rendered;
ii. acknowledgement by the individual that information on the product and/or service was provided to the individual;
iii. acknowledgement that the product or service has been received from the provider; and
iv. a request for accelerated payment by the retirement payment agency to the service provider.

16. The method of claim 15, wherein the third transmission further comprises dollar amount limits for the accelerated payment.

17. The method of claim 15, further comprising the step of monitoring fraud to minimizing fraud within the retirement payment program.

18. The method of claim 15, wherein the smart card identification feature is a member selected from the group consisting of an identification code and a biometrics identification system.

19. The method of claim 15, wherein the first transmission further comprises a member of the group consisting of:
a. a first transmission identification code;
b. provider information that comprises a member of the group consisting of:
provider code;
ii. provider name;
iii. provider address;
iv. provider office code; and
v. provider phone number;
c. individual information that comprises a member of the group consisting of:
i. individual name;
ii. individual address;
iii. a social security number; and
iv. combinations thereof.

20. The method of claim 15, wherein the second transmission further comprises a member of the group consisting of:
a. a notice as to further services or goods potentially needed by the individual;
b. a depiction of the individual; and
c. a second transmission identification code and combinations thereof.

21. The method of claim 15, wherein the third transmission comprises:

a. a tracking number;
b. a date on which the benefit was rendered;
c. a total amount paid to the individual;
d. a statement as to any amount requested that exceeds the authorized service or goods;
e. detail on the codes for rendered services or goods;
f. a third transmission identification code; and
g. combinations thereof.

22. The method of claim 15, wherein the smart card is an electronically readable card comprising information selected from the group consisting of:
a. individual name;
b. individual address;
c. individual phone number;
d. individual fax number;
e. individual email address;
f. a social security number;
g. retirement agency name;
h. retirement agency address;
i. agency phone number;
j. agency fax number;
k. agency e-mail address;
l. agency administrator;
m. description of the retirement plan;
n. individual payment amount;
o. individual's retirement history;
p. other phone numbers;
q. instructions on how to contact the agency;
r. expiration date of the smart card;
s. agency website address;
t. a chip to obtain the information on the retirement agency program; and
u. combinations thereof.

23. The method of claim 15, further comprising the step of disposing marks on the card selected from the group consisting of the agency trademarks and logos, third party trademarks and logos, service provider trademarks and logos and combinations thereof.

24. The method of claim 1, wherein the smart card is used for more than one non-health government benefit program.

25. The method of claim 15, wherein the smart card is used for the retirement agency program and at least one other government program requiring identification.

26. The method of claim 25, wherein the at least one other government program requiring identification is a member selected from the group consisting of U.S. Passport Agency, Immigration and Naturalization Service, Internal Revenue Service, state driver's licensure agencies, state parks, federal parks, federal monuments and combinations thereof.

* * * * *